Patented June 15, 1954

2,681,298

UNITED STATES PATENT OFFICE 2,681,298

PREPARATION FOR AND METHOD OF TREATING HISTOLOGICAL TISSUE

Andrés Ferrari, New York, N. Y., assignor to Technicon Chemical Company, Inc., New York, N. Y., a corporation of New York No Drawing. Application January 27, 1951, Serial No. 208,243

6 Claims. (Cl. 167—84.5)

This invention relates to the preparation of histological tissue specimens for microscopic examination, and more particularly to a deparaffinizing and clearing solution for treating tissue in the course of such preparation.

The preparation of tissue to enable the microscopic examination thereof involves a series of treatments of the tissue prior to the cutting of the sections from the tissue specimens for the staining and mounting of the sections on the microscopic slides. More particularly, in the preparation of the tissue, it is necessary to immerse the tissue successively in a series of liquid agents for certain lengths of time, first to fix the tissue, then to wash the same for removing the fixative, then to dehydrate the tissue, then to immerse the tissue in a clearing agent and thereafter to infiltrate the tissue with paraffin. As pathologists are well aware, the purpose of treating tissue with a clearing agent before infiltrating the tissue with paraffin is to eliminate from the tissue all liquid, which, if not removed, would decrease the refractive index of the tissue and would interfere with the thorough infiltration of the paraffin into the tissue resulting in poorly cut tissue sections. Among pathologists it is recognized that the higher the refractive index, i. e., the transparency, of the tissue, the more easily and accurately it can be examined microscopically.

After the tissue is infiltrated with paraffin, it is cut into thin sections, a microtone being usually used for this purpose, and the thin sections are mounted on glass slides. The mounted sections are then treated with a deparaffinizing solution to remove the paraffin from the tissue. Heretofore toluene or xylene was employed for this purpose, the slides being immersed in a body of toluene or xylene which dissolves and thus removes the paraffin from the tissue. The tissue on the slides is then stained. Usually hematoxylin and eosin stains for the basofilic and acidofilic material, respectively, of the tissue are employed. After the staining the slides are treated with an agent, for example an alcohol or a dehydrant of the character disclosed in my prior application, Ser. No. 81,841, filed March 16, 1949, and assigned to the assignee of my present application, to remove from the tissue the constituents, chiefly water, introduced by the staining media, which, if not removed, would reduce the refractive index of the tissue. After this step in the process, the slides are treated with a clearing agent, usually xylene or toluene, to remove from the tissue section on the slide the liquids remaining therein as the result of the treatment with the alcohol or dehydrant, and to raise the refractive index of the tissue.

Preparation of the tissue, as herein described, is frequently carried out in automatic immersion apparatus or automatic tissue processing machines sold under the trade mark "Autotechnicon" and disclosed in United States Patents 2,157,875 and 2,341,198.

Xylene, toluene and other deparaffinizing and clearing solutions heretofore employed are objectionable for a number of reasons, chief of which are:

(a) They are highly inflammable and therefore constitute a fire hazard.

(b) They evaporate rapidly. Hence, when used in automatic immersion or tissue processing machines it is not unusual to find the tissue has dried while being transferred from one immersion treatment to another. Once a tissue specimen on a slide dries, the specimen on being subsequently reimmersed in a solution, does not regain its original transparency. Too rapid drying of the deparaffinizing solution or of the clearing solution results in the ruination of many valuable slides.

The primary object of the present invention is to provide a deparaffinizing and clearing solution which has the following properties:

1. It has a high solvent power for paraffin.
2. It does not harden the tissue and does not impair the cytological structure thereof.
3. It does not decrease the refractive index of the tissue.
4. It is substantially non-inflammable under the conditions of use.
5. Its drying rate is such that it permits treatment of the slides at a leisurely pace. This eliminates the necessity of rushing because of a fear that the slides will dry, as is the case when using xylene, the solvent commonly used prior to this invention for effecting removal of paraffin and as a clearing solution.

Other objects and advantages of this invention will be apparent from the following detailed description thereof.

In accordance with this invention a deparaffinizing and clearing solution is provided consisting essentially of (1) an aromatic hydrocarbon fraction having a boiling range of from about 350° to about 450° F. and a specific gravity of from about .890 to .895 at 60°/60° F., (2) carbon tetrachloride and (3) xylene. These constituents are mixed in any desired order at room temperature in the proportions of from about 40% to about 80% of the aromatic hydrocarbon fraction, from about 10% to about 20% of carbon tetrachloride and from about 10% to about 20% of xylene. All proportions in this specification are by volume.

The aromatic hydrocarbon fraction is produced by hydroforming an essentially naphthene petroleum fraction. It consists almost entirely of aromatics chief of which are:

1,2,4,5-tetramethylbenzene
1,2,3,5-tetramethylbenzene
1,2-dialkyl benzene
1,3-dialkyl benzene
1,4-dialkyl benzene
1,2,3-trialkyl benzene
1,2,4-trialkyl benzene
Naphthalene The relative proportions of these constituents and the length of the carbon chain of the alkyl groups will depend on the particular naphthene fraction subjected to hydroforming and the conditions of the hydroforming procedure. The fraction should have a distillation range of from about 350° to about 450° F., preferably from about 365° to about 425° F., a dry point of from about 400° to about 425° F., preferably from about 400° to about 415° F., and a specific gravity of from about .890 to about .895 at 60°/60° F., preferably about .892. A preferred aromatic hydrocarbon fraction is that now available commercially under the trade name Solvesso #150, which product is manufactured by the Esso Standard Oil Company of New Jersey.

The carbon tetrachloride raises the flash point of the mixture and this without detrimentally affecting the solvent properties of the mixture for paraffin or for other constituents which tend to lower the refractive index of the tissue. The carbon tetrachloride, xylene and aromatic hydrocarbon fractions above identified blend to produce a homogeneous solution. The incorporation of the xylene in the proportions above given results in a solution having an optimum refractive index and rate of drying.

A preferred example of the deparaffinizing and clearing solution embodying this invention is given below. It will be understood this invention is not limited to this example.

| | Per cent |
|---|---|
| Solvesso #150 | 70 |
| Carbon tetrachloride | 15 |
| Xylene | 15 |

These constituents blend to produce a clear solution having a specific gravity of .990, a refractive index at 25° C. of 1.499, and a flash point (ASTM Cleveland Open Cup ° F.) of 160. At this temperature sufficient chlorinated vapors are given off to actually prevent flashing. In other words, there is a pseudo-flashing, which is immediately extinguished by the chlorinated vapors emanating from the carbon tetrachloride.

It will be understood, that in using the deparaffinizing and clearing solution of the present invention, the paraffin impregnated or infiltrated tissue section mounted on a glass slide is immersed in a body of the solution maintained in a suitable container, such as a beaker. This treatment may be carried out, for example, in an automatic immersion or tissue processing machine, as hereinabove noted, and should be for a period of time sufficient to effect removal of the paraffin from the tissue. A treatment time of about two minutes will usually suffice. The slides containing the tissue are removed from the body of solution, immersed in distilled water, removed from the distilled water, stained, for example, by immersion in a hematoxylin staining medium, removed therefrom, again immersed in distilled water, stained by immersion in a bath of eosin solution, removed therefrom, immersed in distilled water, removed therefrom, immersed in an alcohol or the dehydrant of my above mentioned application, and removed therefrom, and thereafter immersed in the solution of the present invention for clearing. Each period of immersion may be for from 2 to 5 minutes.

The deparaffinizing and clearing solution of this invention involving the three constituents above noted in the proportions above given has been found to combine to a surprising and exceptional extent the desirable properties hereinabove enumerated. It is at least as good as, if not a better, solvent for paraffin than is xylene. It does not evaporate as rapidly as xylene, and, hence, does not result in dry slides with consequent ruination thereof. It is substantially non-inflammable, and, accordingly, minimizes fire hazard. It does not harden the tissue and does not impair the cytological structure thereof. Its refractive index is somewhat higher than that of xylene (1.497 at 25° C. for xylene as compared with 1.4999 at 25° C. for the deparaffinizing and clearing solution of this invention).

Various changes may be made in the invention, in view of the above disclosure, without departing from the underlying idea or principes of the invention within the scope of the appended claims.

Having thus described my invention, what I claim and desire to secure by Letters Patent, is:

1. A deparaffinizing and clearing solution for use in the preparation of histological tissue for microscopic examination consisting essentially of from about 40% to about 80% by volume of an aromatic hydrocarbon fraction having a distillation range of from about 350° to about 450° F. and a specific gravity of from about .890 to about .895 at 60°/60° F., from about 10% to about 20% by volume of carbon tetrachloride, and from about 10% to about 20% by volume of xylene.

2. A deparaffinizing and clearing solution for use in the preparation of histological tissue for microscopic examination consisting essentially of about 70% by volume of an aromatic hydrocarbon fraction having a distillation range of from about 350° to about 450° F. and a specific gravity of from about .890 to about .895 at 60°/60° F., about 15% by volume of carbon tetrachloride, and about 15% by volume of xylene.

3. A deparaffinizing and clearing solution for use in the preparation of histological tissue for microscopic examination consisting essentially of from about 40% to about 80% by volume of an aromatic hydrocarbon fraction produced by hydroforming a naphthene petroleum fraction, which aromatic hydrocarbon fraction consists substantially entirely of 1,2,4,5-tetramethylbenzene, 1,2,3,5-tetramethylbenzene, 1,2-dialkyl benzene, 1,3-dialkyl benzene, 1,4-dialkyl benzene, 1,2,3-trialkyl benzene, 1,2,4-trialkyl benzene and naphthalene, said aromatic hydrocarbon fraction having a distillation range of from about 350° to about 450° F., a dry point of from about 400° to about 425° F., and a specific gravity of from about .890 to about .895 at 60°/60° F., from about 10% to about 20% by volume of carbon tetrachloride and from about 10% to about 20% by volume of xylene.

4. A deparaffinizing and clearing solution for use in the preparation of histological tissue for microscopic examination consisting essentially of about 70% by volume of an aromatic hydrocarbon fraction produced by hydroforming a naphthene petroleum fraction, which aromatic hydrocarbon fraction consists substantially entirely of 1,2,4,5-tetramethylbenzene, 1,2,3,5-tetramethylbenzene, 1,2-dialkyl benzene, 1,3-dialkyl benzene, 1,4-dialkyl benzene, 1,2,3-trialkyl benzene, 1,2,4-trialkyl benzene and naphthalene, said aromatic hydrocarbon fraction having a distillation range of from about 365° to about 425° F., a dry point of from about 400° to about 415° F. and a specific gravity of about .892 at 60°/60° F., about 15% by volume of carbon tetrachloride and about 15% by volume of xylene.

5. In the method of preparing histological tissue for microscopic examination involving the fixing of the tissue, the removal of the fixative, the dehydration of the tissue, the treatment of the dehydrated tissue with a clearing agent, the infiltration of the resultant tissue with paraffin, the cutting of the paraffin impregnated tissue into thin sections, and the mounting of these sections on glass slides, the further steps which comprise immersing the paraffin impregnated tissue sections in a solution consisting essentially of from about 40% to about 80% by volume of an aromatic hydrocarbon fraction having a distillation range of from about 350° to about 450° F. and a specific gravity of from about .890 to about .895 at 60°/60° F., from about 10% to about 20% by volume of carbon tetrachloride, and from about 10% to about 20% by volume of xylene, to effect removal of the paraffin, staining the tissue, and thereafter immersing the stained tissue in a clearing solution containing from about 40% to about 80% by volume of an aromatic hydrocarbon fraction having a distillation range of from about 350° to about 450° F. and a specific gravity of from about .890 to about .895 at 60°/60° F., from about 10% to about 20% by volume of carbon tetrachloride, and from about 10% to about 20% by volume of xylene.

6. In the method of preparing histological tissue for microscopic examination involving the fixing of the tissue, the removal of the fixative, the dehydration of the tissue, the treatment of the dehydrated tissue with a clearing agent, the infiltration of the resultant tissue with paraffin, the cutting of the paraffin impregnated tissue into thin sections, and the mounting of these sections on glass slides, the further steps which comprise immersing the paraffin impregnated tissue sections in a deparaffinizing solution consisting essentially of from about 40% to about 80% by volume of an aromatic hydrocarbon fraction produced by hydroforming a naphthene petroleum fraction, which aromatic hydrocarbon fraction consists substantially entirely of 1,2,4,5-tetramethylbenzene, 1,2,3,5-tetramethylbenzene, 1,2-dialkyl benzene, 1,3-dialkyl benzene, 1,4-dialkyl benzene, 1,2,3-trialkyl benzene, 1,2,4-trialkyl benzene and naphthalene, said aromatic hydrocarbon fraction having a distillation range of from about 350° to about 450° F., a dry point of from about 400° to about 425° F. and a specific gravity of from about .890 to about .895 at 60°/60° F., from about 10% to about 20% by volume of carbon tetrachloride and from about 10% to about 20% by volume of xylene, staining the slides, and thereafter immersing the stained slides in a clearing solution consisting essentially of from about 40% to about 80% by volume of an aromatic hydrocarbon fraction produced by hydroforming a naphthene petroleum fraction, which aromatic hydrocarbon fraction consists substantially entirely of 1,2,4,5-tetramethylbenzene, 1,2,3,5-tetramethylbenzene, 1,2-dialkyl benzene, 1,3-dialkyl benzene, 1,4-dialkyl benzene, 1,2,3-trialkyl benzene, 1,2,4-trialkyl benzene and naphthalene, said aromatic hydrocarbon fraction having a distillation range of from about 350° to about 450° F., a dry point of from about 400° to about 425° F. and a specific gravity of from about .890 to about .895 at 60°/60° F., from about 10% to about 20% by volume of carbon tetrachloride and from about 10% to about 20% by volume of xylene.

References Cited in the file of this patent

UNITED STATES PATENTS

| Number | Name | Date |
|---|---|---|
| 2,168,024 | Ensminger | Aug. 1, 1939 |
| 2,393,580 | Weiskopf | Jan. 22, 1946 |
| 2,410,613 | Ruthruff | Nov. 5, 1946 |

OTHER REFERENCES

Industrial Solvents, Mellan, Reinhold Publishing Co., N. Y. (1950) 2d edition, pages 250 to 252.